Feb. 24, 1931. H. R. FULK 1,794,286
GREASE GUN NOZZLE
Filed Feb. 20, 1930 2 Sheets-Sheet 1
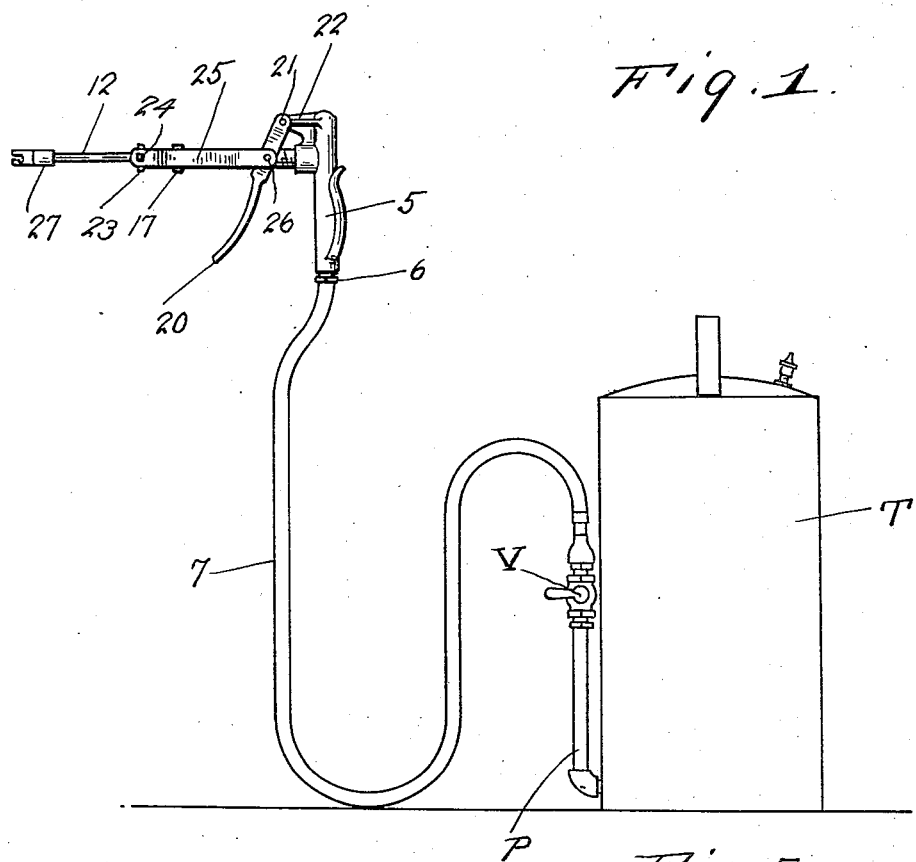
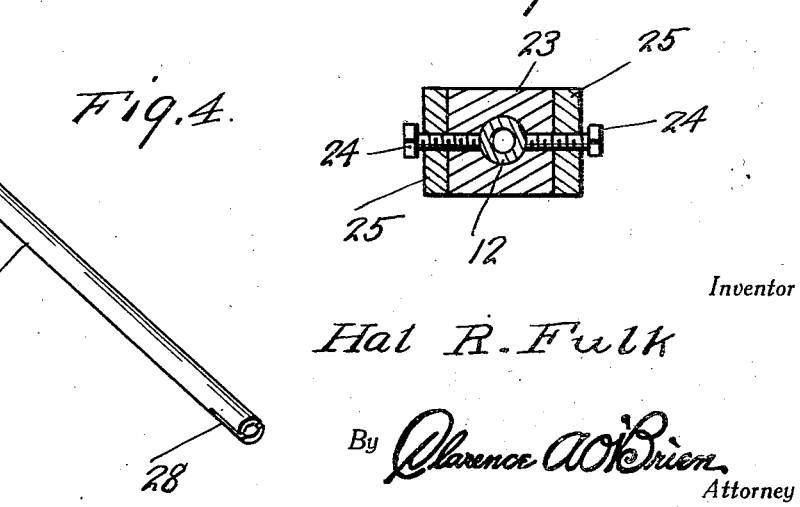
Inventor
Hal R. Fulk
By Clarence A. O'Brien
Attorney

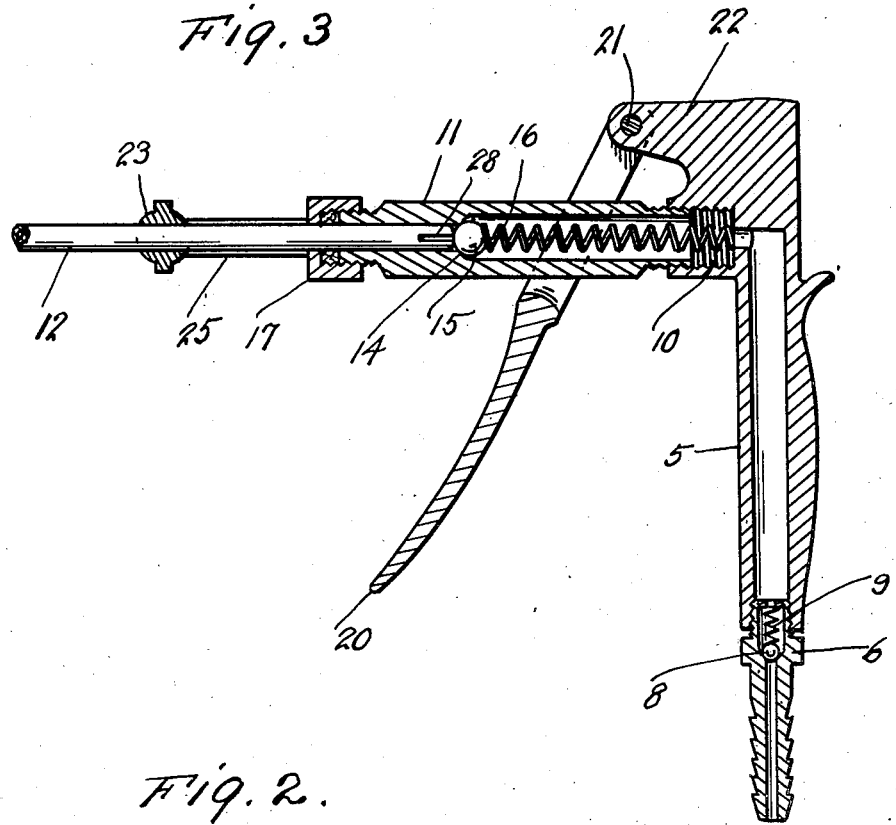
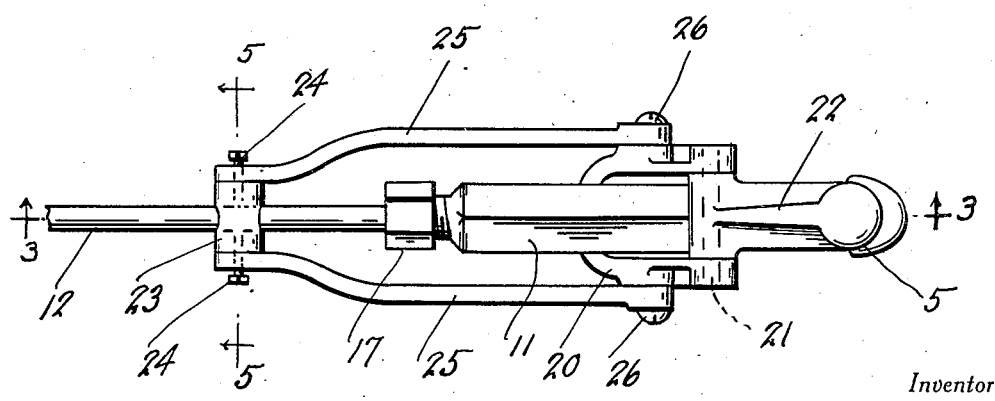

Patented Feb. 24, 1931

1,794,286

UNITED STATES PATENT OFFICE

HAL R. FULK, OF MULVANE, KANSAS

GREASE-GUN NOZZLE

Application filed February 20, 1930. Serial No. 430,014.

The present invention relates to grease guns particularly adapted for use with a grease tank wherein grease is stored under pressure, the object of the invention being to provide a device whereby the grease may be evenly and expeditiously sent to the various grease nipples of an automobile or the like.

Another very important object of the invention resides in the provision of a grease gun of this nature which is simple in its construction, handy, easy to manipulate, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the gun embodying the features of my invention showing the same coupled with a tank, Figure 2 is a top plan view thereof, Figure 3 is a sectional view therethrough taken substantially on the line 3—3 of Figure 2, Figure 4 is a perspective view of the dispensing tube, and Figure 5 is a sectional view taken substantially on the line 5—5 of Figure 2.

Referring to the drawing in detail it will be seen that the numeral 5 denotes a hollow elongated tube in one end of which is threaded a nipple 6 over which is adapted to be placed one end of a hose 7.

A check valve 8 is held against a seat in the nipple 6 by means of a spring 9. A laterally disposed internally threaded bore 10 is formed in the upper portion of the tube 5 in communication with the interior thereof and a tubular member 11 is threadedly engaged therein.

A tube 12 is slidable into the member 11. A valve seat 14 is formed in the member 11 and a ball valve 15 is held against this valve by means of a spring 16. A stuffing box 17 is engaged on the end of the member 11 and the tube 12 is slidable therethrough. A lever 20 is bifurcated at one end to straddle the member 11 and the ends of the furcations are pivoted on a pin 21 extending through an extension 22 on the upper end of the grip 5.

A member 23 is secured to an intermediate portion of the tube 12 by set screws 24 about which are rockable forward ends of links 25, the other ends of which are pivotally engaged by screws 26 with intermediate portions of the furcations of the lever 20.

A suitable coupling 27 is provided on the outer end of the tube 12 so that it will be engaged with the grease nipples of the automobile depending upon the make thereof.

The inner end of the tube has slots 28 formed therein. The letter T denotes a tank to contain grease under pressure which is discharged through pipe P having a valve V thereon and coupled with a hose 7. When the valve V is opened grease is forced up into the hollow tube 5 past the check valve 8, into the tubular member 11 and is prevented from passing out into the tube 12 by the ball valve 15.

Now by pressing the lever 20 toward the tube 5 after the coupling 27 has been engaged it will be seen that the tubular member 11 is slid over the tube 12 thereby unseating the valve 15 so that the grease may pass through the slot 28 and through the tube 12 to grease the parts engaged with the coupling 27. As soon as sufficient grease has been delivered to the parts then the lever 20 is released and the spring 16 is sufficiently strong to press the valve 15 against the seat 14.

It is thought that the construction, operation, and utility of this invention will now be quite apparent to those skilled in this art without a more detailed description thereof.

The present embodiment of the invention has been disclosed in considerable detail merely for the purposes of exemplification since in actual practice they attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a hollow grip, a check valve in one end of the grip opening inwardly thereof, a laterally disposed tubular member connected to the grip and communicating therewith at the other end thereof, a tube slidable into the tubular member, a valve seat formed in the tubular member, a ball in the tubular member, spring means holding the ball in the seat, and means for moving the tube and tubular member with respect to each other for unseating the ball.

2. A device of the class described comprising a hollow grip, a check valve in one end of the grip opening inwardly thereof, a laterally disposed tubular member connected to the grip and communicating therewith at the other end thereof, a tube slidable into the tubular member, a valve seat formed in the tubular member, a ball in the tubular member, spring means holding the ball on the seat, and means for moving the tube and tubular member with respect to each other for unseating the ball, the inner end of the tube being formed with slots.

3. A device of the class described comprising a hollow grip, a check valve in one end of the grip opening inwardly thereof, a laterally disposed tubular member connected to the grip and communicating therewith at the other end thereof, a tube slidable into the tubular member, a valve seat formed in the tubular member, a ball in the tubular member, spring means holding the ball on the seat, and means for moving the tube and tubular member with respect to each other for unseating the ball, the inner end of the tube being formed with slots, said means for moving the tube and tubular member in respect to each other comprising a lever rockably mounted on the grip, links pivoted to the lever and means pivotally engaging the links with the tube intermediate its ends.

In testimony whereof I affix my signature.

HAL R. FULK.